(12) United States Patent
Kato et al.

(10) Patent No.: US 9,909,008 B2
(45) Date of Patent: Mar. 6, 2018

(54) ADDITION-CURABLE LIQUID SILICONE RUBBER COMPOSITION

(71) Applicant: SHIN-ETSU CHEMICAL CO., LTD., Tokyo (JP)

(72) Inventors: Nobu Kato, Annaka (JP); Shigeki Shudo, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/312,256

(22) PCT Filed: Apr. 20, 2015

(86) PCT No.: PCT/JP2015/061965
§ 371 (c)(1),
(2) Date: Nov. 18, 2016

(87) PCT Pub. No.: WO2015/178140
PCT Pub. Date: Nov. 26, 2015

(65) Prior Publication Data
US 2017/0081515 A1      Mar. 23, 2017

(30) Foreign Application Priority Data

May 19, 2014 (JP) ................................ 2014-103127

(51) Int. Cl.
| | |
|---|---|
| C08L 83/04 | (2006.01) |
| C08K 5/5419 | (2006.01) |
| C08K 5/5425 | (2006.01) |
| C08K 3/36 | (2006.01) |
| C08K 9/00 | (2006.01) |
| C08L 83/06 | (2006.01) |

(52) U.S. Cl.
CPC ............. *C08L 83/04* (2013.01); *C08K 3/36* (2013.01); *C08K 9/00* (2013.01); *C08L 83/06* (2013.01); *C08L 2205/025* (2013.01); *C08L 2205/05* (2013.01)

(58) Field of Classification Search
None
See application file for complete search history.

(56) References Cited

U.S. PATENT DOCUMENTS

| | | | | |
|---|---|---|---|---|
| 5,508,369 A | * | 4/1996 | Yamazaki | ............ C07F 7/0859 528/10 |
| 5,597,853 A | * | 1/1997 | Itoh | ......................... C08K 9/06 523/212 |
| 5,908,592 A | * | 6/1999 | Kimura | ................... C08J 3/226 264/102 |
| 2005/0054762 A1 | | 3/2005 | Yaginuma et al. | |
| 2007/0112148 A1 | | 5/2007 | Shudo | |

FOREIGN PATENT DOCUMENTS

| | | | |
|---|---|---|---|
| EP | 1361253 A1 | * 11/2003 | ............. C08L 83/04 |
| EP | 1 361 253 B1 | 4/2006 | |
| EP | 2 100 921 A1 | 9/2009 | |
| EP | 2 165 693 A2 | 3/2010 | |
| EP | 2 554 585 A1 | 2/2013 | |
| JP | 10-140007 A | 5/1998 | |
| JP | 11-228836 A | 8/1999 | |
| JP | 2002-179920 A | 6/2002 | |
| JP | 2003-321609 A | 11/2003 | |
| JP | 2007-131786 A | 5/2007 | |
| JP | 2007-307757 A | 11/2007 | |
| JP | 2009-221295 A | 10/2009 | |
| WO | WO 00/46817 A1 | 8/2000 | |

OTHER PUBLICATIONS

Machine translation of JP 2007/307757 A to Suto et al.*
International Search Report for PCT/JP2015/061965 dated May 19, 2015.
Written Opinion of the International Searching Authority for PCT/JP2015/061965 dated May 19, 2015.
European Search Report for Appl. No. 15796447.9 dated Jan. 5, 2018.

* cited by examiner

*Primary Examiner* — Vu A Nguyen
(74) *Attorney, Agent, or Firm* — Birch, Stewart, Kolasch & Birch, LLP

(57) ABSTRACT

Provided is an addition-curable liquid silicone rubber composition which is suppressed in thickening over time even in cases where a silicone raw rubber is added into a liquid silicone rubber composition, thereby having excellent storage stability, and which provides a silicone rubber that has a low hardness after being cured. An addition-curable liquid silicone rubber composition which contains: (A) an alkenyl group-containing organopolysiloxane having an average polymerization degree of 1,500 or less, which is in a liquid state at room temperature; (B) an organopolysiloxane having an average polymerization degree of 2,000 or more, which is in the form of a raw rubber at room temperature; (C) an organohydrogen polysiloxane; (D) a fumed silica having a BET specific surface area of 130 $m^2/g$ or more; (E) an organosilane and/or organopolysiloxane having a silanol group; and (F) an addition reaction catalyst. This addition-curable liquid silicone rubber composition provides a low-hardness silicone rubber which has a hardness (durometer A) of 5-40 after being cured.

4 Claims, No Drawings

ADDITION-CURABLE LIQUID SILICONE RUBBER COMPOSITION

TECHNICAL FIELD

The present invention relates to an addition-curable liquid silicone rubber composition having excellent storage stability. More specifically, the invention relates to an addition-curable liquid silicone rubber composition which, even when a raw rubber is included therein, undergoes little thickening over time and is able to provide a low-hardness silicone rubber having a durometer A hardness after curing of from 5 to 40.

BACKGROUND ART

Silicone rubbers, on account of their heat resistance, cold resistance, safety, good appearance (transparency), good feel and good durability, are widely used as materials for molding toys, tableware, toothbrushes and the like for infants and small children, and particularly baby bottle nipples and pacifiers. Addition reaction-curing type silicone rubber compositions are especially preferred for use in the above applications on account of the fact that, unlike organic peroxide curing-type silicone rubber compositions, they do not generate by-products due to the decomposition of organic peroxides, and especially on account of their safety.

Silicone rubber nipples for baby bottles that are currently in wide use have a durometer A hardness of from 30 to 50, but silicone rubber nipples of even lower hardness are desired, either in order to diversify the design or for infants having a weak ability to suckle. In terms of applications for low-hardness silicone rubber, there are cases in which low-hardness silicone rubber is used in the portion of a mask that comes into contact with the face. When a low-hardness rubber is used as a mask material, the discomfort experienced on wearing the mask can be reduced. However, lowering the amount of reinforcing silica in silicone rubber so as to produce a low-hardness product leads to a loss of strength, as a result of which cracks form in the rubber when the molded article is removed from the mold, and the rubber is prone to being cut during use. On the other hand, if one tries to achieve a low hardness without reducing the amount of reinforcing silica, that is, by disrupting the addition crosslinking balance, a rubber having permanent set or a rubber that exhibits surface tack is obtained; hence, the rubber has a feel to the touch that makes it ill-suited for use in baby bottle nipples or as a mask material.

In order to resolve such problems, a method has been disclosed which adds a raw silicone rubber to a liquid silicone rubber composition, thereby lowering the rubber hardness and eliminating the sticky feeling (Patent Document 1: JP-A 2003-321609). However, when a raw silicone rubber is added to a liquid silicone rubber composition, even if no crosslinking ingredients are present, the viscosity rises markedly over time, leading to problems with storage stability.

PRIOR ART DOCUMENTS

Patent Documents

Patent Document 1: JP-A 2003-321609

SUMMARY OF THE INVENTION

Problems to be Solved by the Invention

It is therefore an object of the invention to provide an addition-curable liquid silicone rubber composition which, even when a raw silicone rubber has been included therein, undergoes little thickening over time, has an excellent storage stability, and is able to provide a low-hardness silicone rubber having a durometer A hardness after curing of from 5 to 40.

Means for Solving the Problems

As a result of extensive investigations, the inventors have discovered that, by combining a short-chain organopolysiloxane which has terminal silicon-bonded alkenyl groups on the molecular chain and is liquid at room temperature, an organopolysiloxane that is raw rubber-like at room temperature, reinforcing silica, and an organosilane or organopolysiloxane having a specific number of silanol groups per molecule, there can be obtained an addition-curable liquid silicone rubber composition which undergoes little thickening over time, has an excellent storage stability, and is able to provide a low-hardness silicone rubber having a durometer A hardness after curing of from 5 to 40.

Accordingly, the invention provides the following addition-curable liquid silicone rubber composition.

[1] An addition-curable liquid silicone rubber composition which gives a low-hardness silicone rubber having a durometer A hardness after curing of from 5 to 40, comprising:

(A) 100 parts by weight of an alkenyl group-containing organopolysiloxane that includes at least two silicon-bonded alkenyl groups per molecule, has an average degree of polymerization of not more than 1,500 and is liquid at room temperature;

(B) 1 to 200 parts by weight of an organopolysiloxane that has an average degree of polymerization of at least 2,000 and is raw rubber-like at room temperature;

(C) an organohydrogenpolysiloxane containing at least two silicon-bonded hydrogen atoms per molecule, in an amount of 0.2 to 20 parts by weight per 100 parts by weight of components (A) and (B) combined;

(D) fumed silica having a BET specific surface area of at least 130 $m^2/g$, in an amount of 5 to 50 parts by weight per 100 parts by weight of components (A) to (C) combined;

(E) an organosilane and/or organopolysiloxane having one or two silanol groups per molecule, in an amount of 0.1 to 10 parts by weight per 100 parts by weight of components (A) to (D) combined; and (F) a catalytic amount of an addition reaction catalyst.

[2] The addition-curable liquid silicone rubber composition of [1], wherein component (D) is hydrophobically treated fumed silica.

[3] The addition-curable liquid silicone rubber composition of [1] or [2], further comprising:

(G) a silica surface treatment agent, in an amount of 0.1 to 50 parts by weight per 100 parts by weight of component (D).

[4] The addition-curable liquid silicone rubber composition according to any one of [1] to [3], wherein component (E) is trimethylsilanol.

[5] The addition-curable liquid silicone rubber composition according to any one of [1] to [3], wherein component (E) is a linear organopolysiloxane that has an average degree of polymerization of not more than 100 and has a silanol group on both ends of the molecular chain.

[6] The addition-curable liquid silicone rubber composition according to any one of [1] to [5], wherein the silicone rubber mixture of components (A), (B) and (D) to (F) or the silicone rubber mixture of components (A) to (E) has a viscosity at 25° C. and a shear rate of 1 $s^{-1}$ when stored at 70° C. for 7 days which is not more than two times the viscosity at 25° C. and a shear rate of 1 s$^{-1}$ immediately following production.

Advantageous Effects of the Invention

This invention makes it possible to provide addition-curable liquid silicone rubber compositions which, by combining specific amounts of above components (A) to (E), can reduce the rise in viscosity even during long-term storage following production, and moreover can give low-viscosity silicone rubbers having a durometer A hardness after curing of from 5 to 40.

EMBODIMENT FOR CARRYING OUT THE INVENTION

The invention is described more fully below.

First, the alkenyl group-containing organopolysiloxane that is liquid at room temperature (here and below, 25° C.) serving as component (A) is the base polymer of this composition. This alkenyl group-containing organopolysiloxane has an average degree of polymerization of not more than 1,500, preferably includes a silicon-bonded alkenyl group on an end of the molecular chain, and has at least two silicon-bonded alkenyl groups per molecule. In the composition of the invention, the alkenyl group-containing organopolysiloxane that is liquid at room temperature (meaning that it has self-flowing properties) consists solely of this organopolysiloxane (component (A)).

Here, compounds of the average compositional formula (I) below which are liquid at room temperature may be used as the organopolysiloxane having at least two silicon-bonded alkenyl groups per molecule.

$$R^1{}_a SiO_{(4-a)/2} \qquad (I)$$

In the formula, each $R^1$ is a like or unlike substituted or unsubstituted monovalent hydrocarbon group of 1 to 10, preferably 1 to 8, carbon atoms; and the subscript "a" is a positive number from 1.5 to 2.8, preferably from 1.8 to 2.5, and even more preferably from 1.95 to 2.05.

Examples of the substituted or unsubstituted monovalent hydrocarbon group Fe of 1 to 10, preferably 1 to 8, carbon atoms that is bonded to a silicon atom include alkyl groups such as methyl, ethyl, propyl, isopropyl, butyl, isobutyl, tert-butyl, pentyl, neopentyl, hexyl, cyclohexyl, octyl, nonyl and decyl groups; aryl groups such as phenyl, tolyl, xylyl and naphthyl groups; aralkyl groups such as benzyl, phenylethyl and phenylpropyl groups; alkenyl groups such as vinyl, allyl, propenyl, isopropenyl, butenyl, hexenyl, cyclohexenyl and octenyl groups; and any of these groups in which some or all of the hydrogen atoms are substituted with halogen atoms such as fluorine, bromine or chlorine, or with cyano groups, examples of such substituted groups being chloromethyl, chloropropyl, bromoethyl, trifluoropropyl and cyanoethyl groups. Preferably, at least 90 mol % of all the Fe groups are methyl groups.

Also, it is critical for at least two of the Fe groups to be alkenyl groups (these having preferably 2 to 8 carbon atoms, more preferably 2 to 6 carbons, and most preferably being vinyl groups).

The content of alkenyl groups within the organopolysiloxane is preferably set to from $1.0 \times 10^{-6}$ mol/g to $3.0 \times 10^{-3}$ mol/g, and especially from $1.0 \times 10^{-5}$ mol/g to $2.0 \times 10^{-3}$ mol/g. When the amount of alkenyl groups is less than $1.0 \times 10^{-6}$ mol/g, the rubber may have a hardness that is too low and may become gel-like. On the other hand, when this amount is greater than $3.0 \times 10^{-3}$ mol/g, the crosslink density may become too high, the hardness may become extremely high and the rubber may lack elasticity.

The structure of this organopolysiloxane is basically one in which both ends of the molecular chain are capped with triorganosiloxy groups and the backbone has a linear structure consisting of repeating diorganosiloxane units, although the structure may be in part a branched structure, cyclic structure or the like having monoorganosilsesquioxane units.

The alkenyl groups may be bonded to silicon atoms on the ends of the molecular chain (i.e., terminal silicon atoms) or may be bonded to silicon atoms somewhere along the molecular chain (non-terminal silicon atoms). Component (A) of this invention has preferably at least one, and more preferably at least two, alkenyl groups bonded to silicon atoms on the ends of the molecular chain (that is, the silicon atoms in the triorganosiloxy groups) per molecule, and may or may not contain alkenyl groups bonded to silicon atoms somewhere along the molecule chain (that is, silicon atoms in diorganosiloxane units or monoorganosilsesquioxane units). When at least one, and preferably two or more, alkenyl group bonded to a silicon atom at the end of the molecular chain is not included, it may not be possible to obtain a rubber cured product having a low hardness and a high tear strength.

With regard to the molecular weight, the average degree of polymerization (here and below, the number-average degree of polymerization) is not more than 1,500, generally from 100 to 1,500, and preferably from 150 to 1,100. At less than 100, a sufficiently rubbery feel may not be obtained, whereas at above 1,500, the viscosity rises and molding becomes difficult. Here, the molecular weight or degree of polymerization can be determined as, for example, the polystyrene-equivalent number-average molecular weight or number-average degree of polymerization in gel permeation chromatography (GPC) using toluene as the developing solvent (the same applies below).

The organopolysiloxane serving as component (A) is exemplified by diorganopolysiloxanes capped at both ends of the molecular chain with diorganoalkenylsiloxy groups, diorganopolysiloxanes capped at both ends of the molecular chain with organodialkenylsiloxy groups, diorganopolysiloxanes capped at both ends of the molecular chain with trialkenylsiloxy groups, diorganosiloxane-organoalkenylsiloxane copolymers capped at both ends of the molecular chain with triorganosiloxy groups, diorganosiloxane-organoalkenylsiloxane copolymers capped at both ends of the molecular chain with diorganoalkenylsiloxy groups, and diorganosiloxane-organoalkenylsiloxane copolymers capped at one end of the molecular chain with a diorganoalkenylsiloxy group and capped at the other end with a triorganosiloxy group. Of these, diorganopolysiloxanes capped at both ends of the molecular chain with diorganoalkenylsiloxy groups, diorganosiloxane-organoalkenylsiloxane copolymers capped at both ends of the molecular chain with triorganosiloxy groups and/or diorganosiloxane-organoalkenylsiloxane copolymers capped at both ends of the molecular chain with diorganoalkenylsiloxy groups are preferred. As used herein, "organo group" in each of the above siloxanes refers to, of the $R^1$ groups in formula (I), a group similar to the substituted or unsubstituted monovalent hydrocarbon groups, exclusive of alkenyl groups. The fact that the alkenyl group-containing organopolysiloxane of component (A) includes no silanol groups (that is, silicon-bonded hydroxyl groups) on the molecule clearly differentiates it from the subsequently described component (E).

Next, component (B) is an organopolysiloxane that has an average degree of polymerization of at least 2,000 and is raw rubber-like (that is, in a non-liquid state without self-flowing properties) at room temperature (25° C.); this organopolysiloxane may be one of the following average compositional formula (II).

$$R^2_b SiO_{(4-b)/2} \quad (II)$$

In the formula, each $R^2$ is a like or unlike substituted or unsubstituted monovalent hydrocarbon group of 1 to 10, preferably 1 to 8, carbon atoms, and the subscript "b" is a positive number from 1.8 to 2.5, preferably from 1.9 to 2.1, and more preferably from 1.98 to 2.01.

Here, the substituted or unsubstituted monovalent hydrocarbon group $R^2$ of 1 to 10, and preferably 1 to 8, carbon atoms that is bonded to a silicon atom may be exemplified in the same way as $R^1$ above. Illustrative examples include alkyl groups such as methyl, ethyl, propyl, isopropyl, butyl, isobutyl, tert-butyl, pentyl, neopentyl, hexyl, cyclohexyl, octyl, nonyl and decyl groups; aryl groups such as phenyl, tolyl, xylyl and naphthyl groups; aralkyl groups such as benzyl, phenylethyl and phenylpropyl groups; alkenyl groups such as vinyl, allyl, propenyl, isopropenyl, butenyl, hexenyl, cyclohexenyl and octenyl groups; and any of these groups in which some or all of the hydrogen atoms are substituted with halogen atoms such as fluorine, bromine or chlorine, or with cyano groups, examples of such substituted groups being chloromethyl, chloropropyl, bromoethyl, trifluoropropyl and cyanoethyl groups. Preferably, at least 90 mol % of all the $R^1$ groups are methyl groups and the remainder are vinyl groups.

Alkenyl groups (preferably ones having 2 to 8 carbon atoms, more preferably ones having 2 to 6 carbon atoms, and most preferably vinyl groups) may or may not be included among the $R^2$ groups. However, when included, the content of such alkenyl groups is preferably not more than 0.0026 mol/g, and especially not more than 0.0014 mol/g. When the content of alkenyl groups is higher than 0.0026 mol/g, the curing rate may decrease markedly. These alkenyl groups may be bonded to silicon atoms at the ends of the molecular chain, may be bonded to silicon atoms somewhere along the molecular chain, or may be bonded to both.

The structure of this organopolysiloxane is basically a linear structure in which, as with component (A) above, both ends of the molecular chain are capped with triorganosiloxy groups and the backbone consists of repeating diorganosiloxane units, although the structure may be in part a branched structure, cyclic structure or the like.

With regard to the molecular weight, this organopolysiloxane is raw rubber-like (that is, in a non-liquid state without self-flowing properties) at room temperature (25° C.) and has an average degree of polymerization of at least 2,000 (generally from about 2,000 to about 100,000), and preferably has an average degree of polymerization of at least 3,000 (from about 3,000 to about 80,000). At an average degree of polymerization below 2,000, a sufficiently rubbery feel is not obtained and the surface becomes tacky.

The organopolysiloxane serving as this component (B) is exemplified by, as organopolysiloxanes which do not contain alkenyl groups on the molecule: raw diorganopolysiloxane rubbers capped at both ends of the molecular chain with triorganosiloxy groups; and as organopolysiloxanes which contain alkenyl groups on the molecule: raw diorganopolysiloxane rubbers capped at both ends of the molecular chain with diorganoalkenylsiloxy groups, raw diorganopolysiloxane rubbers capped at both ends of the molecular chain with organodialkenylsiloxy groups, raw diorganopolysiloxane rubbers capped at both ends of the molecular chain with trialkenylsiloxy groups, raw diorganosiloxane-organoalkenylsiloxane copolymer rubbers capped at both ends of the molecular chain with triorganosiloxy groups, raw diorganosiloxane-organoalkenylsiloxane copolymer rubbers capped at both ends of the molecular chain with diorganoalkenylsiloxy groups, and raw diorganosiloxane-organoalkenylsiloxane copolymer rubbers capped at one end of the molecular chain with a diorganoalkenylsiloxy group and capped at the other end with a triorganosiloxy group. Of these, raw diorganopolysiloxane rubbers capped at both ends of the molecular chain with triorganosiloxy groups, raw diorganopolysiloxane rubbers capped at both ends of the molecular chain with diorganoalkenylsiloxy groups, raw diorganosiloxane-organoalkenylsiloxane copolymer rubbers capped at both ends of the molecular chain with triorganosiloxy groups and/or raw diorganosiloxane-organoalkenylsiloxane copolymer rubbers capped at both ends of the molecular chain with diorganoalkenylsiloxy groups are preferred. As used herein, "organo group" in each of the above siloxanes refers to, of the $R^2$ moieties in formula (II), a group similar to the substituted or unsubstituted monovalent hydrocarbon groups, exclusive of alkenyl groups. The fact that the raw rubber-like organopolysiloxane of component (B) includes no silanol groups (that is, silicon-bonded hydroxyl groups) on the molecule clearly differentiates it from the subsequently described component (E).

The amount of component (B) per 100 parts by weight of component (A) is from 1 to 200 parts by weight, preferably from 3 to 150 parts by weight, and more preferably from 5 to 120 parts by weight. When the amount included is less than 1 part by weight, the rubber hardness (durometer A) of the cured silicone rubber cannot be adequately lowered. When the amount included is more than 200 parts by weight, the viscosity of the composition is high and so molding is difficult to carry out.

Component (C) is an organohydrogenpolysiloxane containing at least two, and preferably at least three, silicon-bonded hydrogen atoms (SiH groups) per molecule. This component acts as a curing agent for curing the composition by crosslinking via hydrosilylation addition reactions between SiH groups on the molecule and silicon-bonded alkenyl groups in components (A) and (B).

The organohydrogenpolysiloxane used as component (C) is preferably one which has the average compositional formula (III) below and contains at least 2, preferably at least 3, more preferably from 3 to 100, and even more preferably from 4 to 50, silicon-bonded hydrogen atoms (SiH groups) per molecule.

$$R^3_c H_d SiO_{(4-c-d)/2} \quad (III)$$

In the formula, each $R^3$ is a like or unlike substituted or unsubstituted monovalent hydrocarbon group of 1 to 10, and preferably 1 to 8, carbon atoms. The subscript "c" is a positive number from 0.7 to 2.1, the subscript "d" is a positive number from 0.001 to 1.0, and the sum "c+d" is a positive number from 0.8 to 3.0.

Here, the monovalent hydrocarbon group $R^3$ may be exemplified in the same way as $R^1$ above, and is preferably one without aliphatic unsaturated groups.

Also, "c" is a positive number from 0.7 to 2.1, and preferably from 0.8 to 2.0; "d" is a positive number preferably from 0.001 to 1.0, and preferably from 0.01 to 1.0; and the sum "c+d" is a positive number from 0.8 to 3.0, and preferably from 1.0 to 2.5. The molecular structure of the organohydrogenpolysiloxane may be a linear, cyclic, branched or three-dimensional network structure.

Preferred use can be made of an organohydrogenpolysiloxane wherein the number of silicon atoms per molecule (or the degree of polymerization) is from about 2 to about 300, especially from about 4 to about 150, and which is liquid at room temperature (25° C.). The silicon-bonded hydrogen atoms may be positioned either at the ends of the molecular chain or somewhere along the molecular chain, or may be positioned at both.

The organohydrogenpolysiloxane serving as component (C) is exemplified by 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, methylhydrogensiloxane-dimethylsiloxane cyclic copolymers, methylhydrogenpolysiloxanes capped at both ends with trimethylsiloxy groups, dimethylsiloxane-methylhydrogensiloxane copolymers capped at both ends with trimethylsiloxy groups, dimethylpolysiloxane capped at both ends with dimethylhydrogensiloxy groups, dimethylsiloxane-methylhydrogensiloxane copolymers capped at both ends with dimethylhydrogensiloxy groups, methylhydrogensiloxane-diphenylsiloxane copolymers capped at both ends with trimethylsiloxy groups, methylhydrogensiloxane-diphenylsiloxane-dimethylsiloxane copolymers capped at both ends with trimethylsiloxy groups, methylhydrogensiloxane-methylphenylsiloxane-dimethylsiloxane copolymers capped at both ends with trimethylsiloxy groups, methylhydrogensiloxane-dimethylsiloxane-diphenylsiloxane copolymers capped at both ends with dimethylhydrogensiloxy groups, methylhydrogensiloxane-dimethylsiloxane-methylphenylsiloxane copolymers capped at both ends with dimethylhydrogensiloxy groups, copolymers consisting of $(CH_3)_2HSiO_{1/2}$ units, $(CH_3)_3SiO_{1/2}$ units and $SiO_{4/2}$ units, copolymers consisting of $(CH_3)_2HSiO_{1/2}$ units and $SiO_{4/2}$ units, copolymers consisting of $(CH_3)_2HSiO_{1/2}$ units, $SiO_{4/2}$ units and $(C_6H_5)SiO_{3/2}$ units, and any of these compounds in which some or all of the methyl groups are substituted with other alkyl groups, phenyl groups or the like.

Alternatively, the organohydrogenpolysiloxane of component (C) may be a polyvalent aromatic ring-containing organohydrogenpolysiloxane which includes, on part of the siloxane skeleton making up the molecule in the above-mentioned compounds, an aromatic ring-containing hydrocarbon skeleton that generally has a valence of 2 to 4 (e.g., a phenylene skeleton, bisphenylene skeleton, bis(phenylene) ether skeleton, bis(phenylene)methane skeleton, 2,2-bis(phenylene)propane skeleton, or 2,2-bis(phenylene)hexafluoropropane skeleton).

The organohydrogenpolysiloxane serving as component (C) is included in an amount of from 0.2 to 20 parts by weight, and preferably from 0.3 to 10 parts by weight, per 100 parts by weight of the combined amount of components (A) and (B). Moreover, this amount is preferably such that the molar ratio of silicon-bonded hydrogen atoms (SiH groups) in the above organohydrogenpolysiloxane to the combined amount of silicon-bonded alkenyl groups in components (A) and (B), which ratio is expressed as (SiH groups/alkenyl groups), is from 0.8 to 10, and especially from 1.0 to 5. When this ratio is smaller than 0.8, crosslinking may be inadequate and the rubber may become tacky. On the other hand, when the ratio is larger than 10, foaming may arise in the molded article or separation of the molded article from the mold may be difficult.

The fumed silica serving as component (D) is essential for imparting sufficient strength to the resulting silicone rubber. The BET specific surface area of the fumed silica is at least 130 $m^2/g$, typically from 130 to 400 $m^2/g$, and preferably from 130 to 380 $m^2/g$. When this is smaller than 130 $m^2/g$, a sufficient strength cannot be obtained and the transparency of the molded article decreases. On the other hand, when this is larger than 400 $m^2/g$, compounding is difficult and discoloration may occur.

The fumed silica (D) is included in an amount of from 5 to 50 parts by weight, and preferably from 10 to 40 parts by weight, per 100 parts by weight of the combined amount of components (A) to (C). When the amount included is less than 5 parts by weight, a sufficient rubber strength is not obtained. On the other hand, when the amount is more than 50 parts by weight, the viscosity rises and molding is difficult to carry out.

It is generally preferable to use, as the fumed silica of component (D), one whose surface has been hydrophobically treated. When not surface-treated, dispersibility in silicone oil worsens and silica aggregates may form or compounding may be difficult. Surface treatment of the silica may be carried out by directly surface-treating the silica beforehand while in a powdered state with a silica surface treatment agent (surface hydrophobizing treatment agent), or may be carried out in-situ by mixture under heating together with the subsequently described (G) silica surface treatment agent (surface hydrophobizing agent) when the non-surface-treated fumed silica is mixed together with component (A) in the course of preparing the inventive composition.

The treatment method in a normal powdered state may entail treatment by a commonly known technique, such as placing the above untreated silica fine powder and the subsequently described silica surface treatment agent (G) at atmospheric pressure in a closed mechanical kneading apparatus or a fluidized bed, and carrying out mixing treatment at room temperature or under heat treatment in, where necessary, the presence of an inert gas. In some cases, treatment may be promoted using a catalyst. After kneading, a treated silica fine power can be produced by drying.

Alternatively, the final silicone rubber composition can be obtained by carrying out, as a fumed silica surface treatment method in the course of preparation of the inventive composition, surface hydrophobizing treatment of fumed silica by mixing together, under applied heat, part or all of component (A) and the not yet surface-treated fumed silica with the subsequently described silica surface treatment agent (surface hydrophobizing agent) of component (G) in the presence of, where necessary, a small amount of water, and simultaneously preparing a silicone rubber base of component (A) in which the surface hydrophobized fumed silica has been uniformly mixed and dispersed, and then adding the remaining components (the balance of component (A), as well as components (B) to (F) and other, optional, ingredients) to this silicone rubber base and uniformly mixing.

As noted above, the silica surface treatment agent (G) is an ingredient that can be used for hydrophobically treating the surface of the fumed silica serving as component (D). Illustrative examples of the silica surface treatment agent of component (G) include silazanes such as hexamethyldisilazane and divinyltetramethyldisilazane; silane-type coupling agents such as methyltrimethoxysilane, ethyltrimethoxysilane, propyltrimethoxysilane, butyltrimethoxysilane, dimethyldimethoxysilane, diethyldimethoxysilane, vinyltriethoxysilane, vinyltrimethoxysilane, trimethylmethoxysilane, triethylmethoxysilane, vinyltris(methoxyethoxy)silane, trimethylchlorosilane, dimethyldichlorosilane, divinyldimethoxysilane and chloropropyltrimethoxysilane; and other organosilicon compounds such as polymethylsiloxane and organohydrogenpolysiloxane. Silane-type coupling agents and silazanes are especially preferred as the treatment agent. When component (G) is used, the amount included per 100 parts of component (D) is preferably from 0.1 to 50 parts by weight, and more preferably from 0.5 to 30 parts by weight. When the amount included is less than 0.1 part by weight, surface treatment of the silica may be inadequate. On the other hand, when more than 50 parts by weight is included, this may interfere with the addition reaction or lower the reinforcing effect.

The organosilane and/or organopolysiloxane having one or two silanol groups per molecule serving as component (E) is an ingredient that prevents thickening of the overall composition due to interactions between components (B) and (D). Illustrative examples include organosilane compounds that are liquid at room temperature (25° C.), such as trimethylsilanol, triethylsilanol, dimethylvinylsilanol, dimethylsilanediol and diphenylsilanediol; branched siloxane compounds such as tris(trimethylsiloxy)silanol; and linear organopolysiloxane compounds which are liquid at room temperature (25° C.), such as dimethylpolysiloxanes that are capped at both ends of the molecular chain with dimethylhydroxysiloxy groups, dimethylpolysiloxanes that are capped at one end with a dimethylhydroxysiloxy group and capped at one end with a trimethylsiloxy group. In the case of organosilane compounds and branched siloxane compounds in particular, trimethylsilanol and tris(trimethylsiloxy)silanol are preferred in terms of synthesis. In the case of linear organopolysiloxane compounds, a dimethylpolysiloxane capped at one end or both ends with dimethylhydroxysiloxy groups that is liquid at room temperature (25° C.) and has a (number-average) degree of polymerization of not more than 100 (generally from 2 to 100), and preferably not more than 80 (especially from about 5 to about 80) is preferred. When the degree of polymerization of the linear organopolysiloxane compound exceeds 100, it may not be possible to fully exhibit a thickening-preventing effect. Component (E) is more preferably trimethylsilanol or a linear organopolysiloxane which has silanol groups at both ends of the molecular chain, has an average degree of polymerization of not more than 100, and is liquid at room temperature.

The fact that the organosilane and/or organopolysiloxane of component (E) includes one or two silanol groups on the molecule clearly differentiates it from above components (A) and (B) which contain no silanol groups on the molecule.

The amount of component (E) included per 100 parts by weight of components (A) to (D) combined is from 0.1 to 10 parts by weight, preferably from 0.1 to 8 parts by weight, and more preferably from 0.1 to 5 parts by weight. When the amount added is less than 0.1 part by weight, a thickening-preventing effect cannot be fully exhibited. On the other hand, when this amount is more than 10 parts by weight, foaming arises during curing.

The addition reaction catalyst of component (F) is exemplified by platinum catalysts such as platinum black, platinic chloride, chloroplatinic acid, reaction products of chloroplatinic acid with monohydric alcohols, complexes of chloroplatinic acid with olefins and platinum bisacetoacetate, palladium catalysts, and rhodium catalysts.

This addition reaction catalyst may be included in a catalytic amount. The content, expressed in terms of the weight of the platinum family metal, is generally from about 0.5 to about 1,000 ppm, and especially from about 1 to about 500 ppm, with respect to the combined weight of components (A) to (E).

Where necessary, the addition-curable liquid silicone rubber composition of the invention may optionally include, as other ingredients, fillers such as precipitated silica, quartz powder, diatomaceous earth and calcium carbonate; conductive materials such as carbon black, conductive zinc white and metal powders; hydrosilylation reaction regulators such as nitrogen-containing compounds, acetylene compounds, phosphorus compounds, nitrile compounds, carboxylates, tin compounds, mercury compounds and sulfur compounds; heat-resistance agents such as iron oxides and cerium oxide; internal mold release agents such as dimethylsilicone oil, tackifiers (especially organosilicon compounds such as alkoxysilanes which contain on the molecule at least one type of functional group selected from among alkenyl, epoxy, amino, (meth)acryloxy and mercapto groups, and which moreover contain no SiH groups on the molecule), and thixotropic agents.

When all of components (A) to (F) of the addition-curable liquid silicone rubber composition of the invention are mixed together, crosslinking reactions proceed over time at room temperature. Hence, during long-term storage of the composition, it is preferable to store components (C) and (F) separately.

Compositions in which components (C) and component (F) have been separated from one another, i.e., silicone rubber mixtures of components (A), (B) and (D) to (F) and silicone rubber mixtures of components (A) to (E), have viscosities when used in injection molding such that, generally, the viscosity at 25° C. and a shear rate of 1 $s^{-1}$ is in the range of preferably 30 to 10,000 Pa·s, more preferably 50 to 5,000 Pa·s, and even more preferably 100 to 3,000 Pa·s. When this viscosity is less than 30 Pa·s or more than 10,000 Pa·s, molding may become difficult. Measurement of these viscosities at a specific shear rate can be carried out using a precision rotational viscometer, such as the HAAKE RheoStress 6000 viscometer (Thermo Scientific) or the RotoVisco RV1 viscometer (HAAKE).

The rise in viscosity over time of silicone rubber mixtures consisting of components (A), (B) and (D) to (F) and silicone rubber mixtures consisting of components (A) to (E) is preferably such that the viscosity at 25° C. and a shear rate of 1 $s^1$ when stored at 70° C. for 7 days is not more than 2 times, and especially not more than 1.5 times, the viscosity at 25° C. and a shear rate of 1 $s^{-1}$ immediately following production. When the material viscosity in injection molding is higher than twice the set value, molding may be difficult unless the molding conditions are modified, and it may become impossible to draw up the material with a pump. In order to set the rise in viscosity over time to not more than 2 times, it is desirable to include components (B), (D) and (E) within the mixture in amounts that are suitable for each.

Customary methods may be employed for molding and curing this silicone rubber composition, although a liquid-injection-molding process is preferably used as the molding method. The curing conditions that may be used are heat treatment conditions of about 120 to 230° C. for about 3 seconds to about 10 minutes, and preferably about 150 to 210° C. for about 5 seconds to about 3 minutes. The silicone rubber elastomer obtained by curing the silicone rubber composition of the invention under such conditions can provide a low-hardness silicone rubber having a durometer A hardness, based on JIS-K6249, of from 5 to 40, preferably from 5 to 35, and more preferably from 5 to 30, and moreover can provide a silicone rubber having a low hardness while also having a high strength and high elongation, the tensile strength being about 2.5 to 15 MPa, the tear strength (crescent specimen) being about 5 to 50 kN/m and the elongation at break being about 700 to 1,000% (all based on JIS-K6349). A silicone rubber having the above hardness and other values can be achieved by including components (A) to (E) in suitable proportions (weight ratios) within the composition.

The addition-curable liquid silicone rubber composition of the invention undergoes little thickening over time even when raw silicone rubber has been added and has an excellent storage stability, making it useful for injection molding applications.

The addition-curable liquid silicone rubber composition of the invention can be advantageously used in baby bottle nipples, mask materials and other applications.

EXAMPLES

The invention is illustrated more fully below by way of Working Examples and Comparative Examples, although these Examples are not intended to limit the invention. All references to "parts" are by weight. Also, "room temperature" is 25° C., and "average degree of polymerization" refers to the polystyrene-equivalent number-average degree of polymerization as determined by gel permeation chromatographic (GPC) analysis using toluene as the developing solvent.

Working Example 1

Sixty parts of dimethylpolysiloxane (A1) capped at both ends with dimethylvinylsiloxy groups and having an average degree of polymerization of 750, 40 parts of fumed silica (D1) having a BET specific surface area of 300 m$^2$/g (Aerosil 300, from Nippon Aerosil Co., Ltd.), 8 parts of hexamethyldisilazane and 2.0 parts of water were mixed together for 30 minutes at room temperature, after which the temperature was raised to 150° C. and stirring was continued for 3 hours, followed by cooling, thereby giving a silicone rubber base.

Fifty parts of the dimethylpolysiloxane (A1), 20 parts of raw dimethylpolysiloxane rubber (B1) capped on both ends with trimethylsiloxy groups and having an average degree of polymerization of 8,000, and 0.5 part of dimethylpolysiloxane (E1) capped on both ends with dimethylhydroxysiloxy groups and having an average degree of polymerization of 10 were placed in 100 parts of this silicone rubber base and stirring was continued for 30 minutes. Next, 0.86 part of methylhydrogenpolysiloxane (C1) capped on both ends with trimethylsiloxy groups and having pendant SiH groups (degree of polymerization, 27; SiH group content, 0.0069 mol/g) as a crosslinking agent and 0.05 part of ethynylcyclohexanol as a reaction regulator were added and stirring was continued for 15 minutes, giving a silicone rubber mixture.

Immediately following production, this silicone rubber mixture was stored at 70° C. for 7 days, after which the viscosity at 25° C. and a shear rate of 1 s$^{-1}$ was measured with a RotoVisco RV1 precision rotational viscometer (HAAKE). The results are shown in Table 1.

Next, 0.1 part of platinum catalyst (Pt concentration, 1 wt %) was mixed into this silicone rubber mixture to form a silicone rubber composition, and the composition was pre-cured at 120° C. for 10 minutes and then post-cured in an oven at 150° C. for 1 hour. The resulting cured product was measured for hardness, tensile strength, elongation at break and tear strength (crescent specimen) based on JIS-K6249. The results are shown in Table 2.

Working Example 2

Seventy parts of dimethylpolysiloxane (A1) capped at both ends with dimethylvinylsiloxy groups and having an average degree of polymerization of 750, 40 parts of fumed silica (D2) having a BET specific surface area of 230 m$^2$/g (Reolosil DS-30S, from Tokuyama Corporation) and 2.0 parts of water were mixed together for 30 minutes at room temperature, after which the temperature was raised to 150° C. and stirring was continued for 3 hours, followed by cooling, thereby giving a silicone rubber base.

Forty-five parts of the dimethylpolysiloxane (A1), 5 parts of a dimethylpolysiloxane (A2) capped on both ends with trimethylsiloxy groups, in which 2.5 mol % of the pendant methyl groups are vinyl groups (meaning that 2.5 mol % of all the monovalent hydrocarbon groups bonded to silicon atoms on the diorganosiloxane units making up the backbone are vinyl groups and the remaining 97.5 mol % are methyl groups; the same applies below) and having an average degree of polymerization of 200, and 20 parts of raw dimethylpolysiloxane rubber (B2) capped on both ends with dimethylvinylsiloxy groups and having an average degree of polymerization of 6,000 were placed in 110 parts of this silicone rubber base and stirring was continued for 30 minutes. Next, 0.5 part of trimethylsilanol (E2), 1.9 parts of methylhydrogenpolysiloxane (C1) capped on both ends with trimethylsiloxy groups and having pendant SiH groups (degree of polymerization, 27; SiH group content, 0.0069 mol/g) as a crosslinking agent, and 0.05 part of ethynylcyclohexanol as a reaction regulator were added and stirring was continued for 15 minutes, giving a silicone rubber mixture.

Immediately following production, this silicone rubber mixture was stored at 70° C. for 7 days, after which the viscosity at 25° C. and a shear rate of 1 s$^{-1}$ was measured with a RotoVisco RV1 precision rotational viscometer (HAAKE). The results are shown in Table 1.

Next, 0.1 part of platinum catalyst (Pt concentration, 1 wt %) was mixed into this silicone rubber mixture to form a silicone rubber composition, and the composition was pre-cured at 120° C. for 10 minutes and then post-cured in an oven at 150° C. for 1 hour. The resulting cured product was measured for hardness, tensile strength, elongation at break and tear strength (crescent specimen) based on JIS-K6249. The results are shown in Table 2.

Working Example 3

Sixty-five parts of dimethylpolysiloxane (A1) capped at both ends with dimethylvinylsiloxy groups and having an average degree of polymerization of 750, 40 parts of fumed silica (D1) having a BET specific surface area of 300 m$^2$/g (Aerosil 300, from Nippon Aerosil Co., Ltd.), 8 parts of hexamethyldisilazane, 0.1 part of 1,3-divinyl-1,1,3,3-tetramethyldisilazane and 2.0 parts of water were mixed together for 30 minutes at room temperature, after which the temperature was raised to 150° C. and stirring was continued for 3 hours, followed by cooling, thereby giving a silicone rubber base.

Twenty-five parts of the dimethylpolysiloxane (A1), 20 parts of dimethylpolysiloxane (A3) capped on both ends with dimethylvinylsiloxy groups and having an average degree of polymerization of 1,100, 10 parts of raw dimethylpolysiloxane rubber (B3) capped on both ends with trimethylsiloxy groups and having an average of 10 vinyl groups per molecule, and 1.0 part of tris(trimethylsiloxy)silanol (E3) were placed in 105 parts of this silicone rubber base and stirring was continued for 30 minutes. Next, 1.3 parts of methylhydrogenpolysiloxane (C2) having SiH groups on both ends and on side chains (degree of polymerization, 17; SiH group content, 0.0053 mol/g) as a crosslinking agent and 0.05 part of ethynylcyclohexanol as a reaction regulator were added and stirring was continued for 15 minutes, giving a silicone rubber mixture.

Immediately following production, this silicone rubber mixture was stored at 70° C. for 7 days, after which the viscosity at 25° C. and a shear rate of 1 s$^{-1}$ was measured with a RotoVisco RV1 precision rotational viscometer (HAAKE). The results are shown in Table 1.

Next, 0.1 part of platinum catalyst (Pt concentration, 1 wt %) was mixed into this silicone rubber mixture to form a silicone rubber composition, and the composition was pre-cured at 120° C. for 10 minutes and then post-cured in an oven at 150° C. for 1 hour. The resulting cured product was measured for hardness, tensile strength, elongation at break and tear strength (crescent specimen) based on JIS-K6249. The results are shown in Table 2.

Working Example 4

Sixty parts of dimethylpolysiloxane (A1) capped at both ends with dimethylvinylsiloxy groups and having an average degree of polymerization of 750, 40 parts of fumed silica (D3) having a BET specific surface area of 200 m$^2$/g (Aerosil 200, from Nippon Aerosil Co., Ltd.), 6 parts of hexamethyldisilazane and 2.0 parts of water were mixed together for 30 minutes at room temperature, after which the temperature was raised to 150° C. and stirring was continued for 3 hours, followed by cooling, thereby giving a silicone rubber base.

Twenty-five parts of the dimethylpolysiloxane (A1), 15 parts of dimethylpolysiloxane (A4) capped on both ends with dimethylvinylsiloxy groups and having an average degree of polymerization of 220, 5 parts of dimethylpolysiloxane (A2) capped on both ends with trimethylsiloxy groups, in which 2.5 mol % of the pendant methyl groups are vinyl groups and which had an average degree of polymerization of 200, 10 parts of raw dimethylpolysiloxane rubber (B1) capped on both ends with trimethylsiloxy groups and having an average degree of polymerization of 8,000, 10 parts of raw dimethylpolysiloxane rubber (B4) capped on both ends with trimethylsiloxy groups, having an average of 40 pendant vinyl groups and having an average degree of polymerization of 8,000, and 0.2 part of trimethylsilanol (E2) were placed in 100 parts of this silicone rubber base and stirring was continued for 30 minutes. Next, 1.8 parts of methylhydrogenpolysiloxane (C1) capped on both ends with trimethylsiloxy groups and having pendant SiH groups (degree of polymerization, 27; SiH group content, 0.0069 mol/g) and 2.4 parts of methylhydrogenpolysiloxane (C3) having SiH groups only at both ends (degree of polymerization, 20; SiH group content, 0.0014 mol/g) as crosslinking agents and 0.05 part of ethynylcyclohexanol as a reaction regulator were added and stirring was continued for 15 minutes, giving a silicone rubber mixture.

Immediately following production, this silicone rubber mixture was stored at 70° C. for 7 days, after which the viscosity at 25° C. and a shear rate of 1 s$^{-1}$ was measured with a RotoVisco RV1 precision rotational viscometer (HAAKE). The results are shown in Table 1.

Next, 0.1 part of platinum catalyst (Pt concentration, 1 wt %) was mixed into this silicone rubber mixture to form a silicone rubber composition, and the composition was pre-cured at 120° C. for 10 minutes and then post-cured in an oven at 150° C. for 1 hour. The resulting cured product was measured for hardness, tensile strength, elongation at break and tear strength (crescent specimen) based on JIS-K6249. The results are shown in Table 2.

Working Example 5

Sixty-five parts of dimethylpolysiloxane (A1) capped at both ends with dimethylvinylsiloxy groups and having an average degree of polymerization of 750, 40 parts of fumed silica (D1) having a BET specific surface area of 300 m$^2$/g (Aerosil 300, from Nippon Aerosil Co., Ltd.), 8 parts of hexamethyldisilazane, 0.1 part of 1,3-divinyl-1,1,3,3-tetramethyldisilazane and 2.0 parts of water were mixed together for 30 minutes at room temperature, after which the temperature was raised to 150° C. and stirring was continued for 3 hours, followed by cooling, thereby giving a silicone rubber base.

Twenty-five parts of the dimethylpolysiloxane (A1), 60 parts of raw dimethylpolysiloxane rubber (B5) capped on both ends with dimethylvinylsiloxy groups and having an average degree of polymerization of 8,000, 80 parts of dimethylpolysiloxane capped on both ends with trimethylsiloxy groups and having an average degree of polymerization of 70, and 1.0 part of dimethylpolysiloxane (E1) capped at both ends with dimethylhydroxysiloxy groups and having an average degree of polymerization of 10 were placed in 105 parts of this silicone rubber base and stirring was continued for 30 minutes. Next, 0.65 part of methylhydrogenpolysiloxane (C2) having SiH groups on both ends and side chains (degree of polymerization, 17; SiH group content, 0.0053 mol/g), 0.57 part of methylhydrogenpolysiloxane (C3) having SiH groups only at both ends (degree of polymerization, 20; SiH group content, 0.0014 mol/g) and 0.30 part of a compound of formula (1) below having a phenylene skeleton and SiH groups (C4)

[Chemical Formula 1]

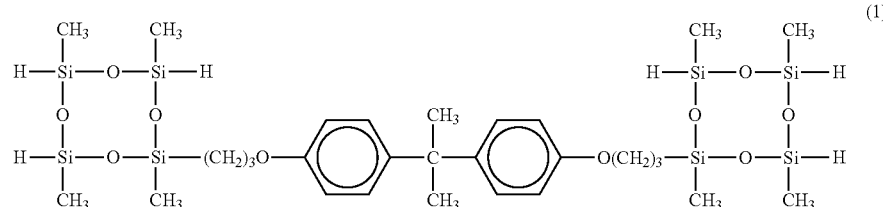

(SiH group content, 0.0079 mol/g) as crosslinking agents and 0.05 part of ethynylcyclohexanol as a reaction regulator were added and stirring was continued for 15 minutes, giving a silicone rubber mixture.

Immediately following production, this silicone rubber mixture was stored at 70° C. for 7 days, after which the viscosity at 25° C. and a shear rate of 1 s$^{-1}$ was measured with a RotoVisco RV1 precision rotational viscometer (HAAKE). The results are shown in Table 1.

Next, 0.1 part of platinum catalyst (Pt concentration, 1 wt %) was mixed into this silicone rubber mixture to form a silicone rubber composition, and the composition was pre-cured at 120° C. for 10 minutes and then post-cured in an oven at 150° C. for 1 hour. The resulting cured product was measured for hardness, tensile strength, elongation at break and tear strength (crescent specimen) based on JIS-K6249. The results are shown in Table 2.

Comparative Example 1

A silicone rubber mixture in which dimethylpolysiloxane (E1) capped on both ends with dimethylhydroxysiloxy groups was excluded from the (platinum catalyst-free) silicone rubber mixture of Working Example 1 was prepared.

Immediately following production, this silicone rubber mixture was stored at 70° C. for 7 days, after which the viscosity at 25° C. and a shear rate of 1 s$^{-1}$ was measured with a RotoVisco RV1 precision rotational viscometer (HAAKE). The results are shown in Table 1.

Next, 0.1 part of platinum catalyst (Pt concentration, 1 wt %) was mixed into this silicone rubber mixture to form a silicone rubber composition, and the composition was pre-cured at 120° C. for 10 minutes and then post-cured in an oven at 150° C. for 1 hour. The resulting cured product was measured for hardness, tensile strength, elongation at break and tear strength (crescent specimen) based on JIS-K6249. The results are shown in Table 2.

Comparative Example 2

A silicone rubber mixture in which trimethylsilanol (E2) was excluded from the (platinum catalyst-free) silicone rubber mixture of Working Example 2 was prepared.

Immediately following production, this silicone rubber mixture was stored at 70° C. for 7 days, after which the viscosity at 25° C. and a shear rate of 1 s$^{-1}$ was measured with a RotoVisco RV1 precision rotational viscometer (HAAKE). The results are shown in Table 1.

Next, 0.1 part of platinum catalyst (Pt concentration, 1 wt %) was mixed into this silicone rubber mixture to form a silicone rubber composition, and the composition was pre-cured at 120° C. for 10 minutes and then post-cured in an oven at 150° C. for 1 hour. The resulting cured product was measured for hardness, tensile strength, elongation at break and tear strength (crescent specimen) based on JIS-K6249. The results are shown in Table 2.

Comparative Example 3

A silicone rubber mixture in which tris(trimethylsiloxy) silanol (E3) was excluded from the (platinum catalyst-free) silicone rubber mixture of Working Example 3 was prepared.

Immediately following production, this silicone rubber mixture was stored at 70° C. for 7 days, after which the viscosity at 25° C. and a shear rate of 1 s$^{-1}$ was measured with a RotoVisco RV1 precision rotational viscometer (HAAKE). The results are shown in Table 1.

Next, 0.1 part of platinum catalyst (Pt concentration, 1 wt %) was mixed into this silicone rubber mixture to form a silicone rubber composition, and the composition was pre-cured at 120° C. for 10 minutes and then post-cured in an oven at 150° C. for 1 hour. The resulting cured product was measured for hardness, tensile strength, elongation at break and tear strength (crescent specimen) based on JIS-K6249. The results are shown in Table 2.

Comparative Example 4

A silicone rubber mixture in which trimethylsilanol (E2) was excluded from the (platinum catalyst-free) silicone rubber mixture of Working Example 4 was prepared.

Immediately following production, this silicone rubber mixture was stored at 70° C. for 7 days, after which the viscosity at 25° C. and a shear rate of 1 s$^{-1}$ was measured with a RotoVisco RV1 precision rotational viscometer (HAAKE). The results are shown in Table 1.

Next, 0.1 part of platinum catalyst (Pt concentration, 1 wt %) was mixed into this silicone rubber mixture to form a silicone rubber composition, and the composition was pre-cured at 120° C. for 10 minutes and then post-cured in an oven at 150° C. for 1 hour. The resulting cured product was measured for hardness, tensile strength, elongation at break and tear strength (crescent specimen) based on JIS-K6249. The results are shown in Table 2.

Comparative Example 5

A silicone rubber mixture in which dimethylpolysiloxane (E1) capped on both ends with dimethylhydroxysiloxy groups and having an average degree of polymerization of 10 was excluded from the (platinum catalyst-free) silicone rubber mixture of Working Example 5 was prepared.

Immediately following production, this silicone rubber mixture was stored at 70° C. for 7 days, after which the viscosity at 25° C. and a shear rate of 1 s$^{-1}$ was measured with a RotoVisco RV1 precision rotational viscometer (HAAKE). The results are shown in Table 1.

Next, 0.1 part of platinum catalyst (Pt concentration, 1 wt %) was mixed into this silicone rubber mixture to form a silicone rubber composition, and the composition was pre-cured at 120° C. for 10 minutes and then post-cured in an oven at 150° C. for 1 hour. The resulting cured product was measured for hardness, tensile strength, elongation at break and tear strength (crescent specimen) based on JIS-K6249. The results are shown in Table 2.

TABLE 1

| | Working Example | | | | | Comparative Example | | | | |
|---|---|---|---|---|---|---|---|---|---|---|
| | 1 | 2 | 3 | 4 | 5 | 1 | 2 | 3 | 4 | 5 |
| Viscosity $\eta_0$ immediately after production (Pa · s) | 620 | 500 | 820 | 960 | 600 | 560 | 510 | 830 | 960 | 530 |
| Viscosity $\eta_1$ after 7 days at 70° C. (Pa · s) | 730 | 560 | 1,080 | 1,190 | 750 | 4,800 | 3,300 | 2,080 | 11,300 | 2,980 |
| Thickening ratio ($\eta_1/\eta_0$) | 1.18 | 1.12 | 1.32 | 1.24 | 1.25 | 8.57 | 6.47 | 2.51 | 11.8 | 5.62 |

TABLE 2

| | Working Example | | | | | Comparative Example | | | | |
|---|---|---|---|---|---|---|---|---|---|---|
| | 1 | 2 | 3 | 4 | 5 | 1 | 2 | 3 | 4 | 5 |
| Hardness (durometer A) | 23 | 26 | 32 | 34 | 8 | 23 | 26 | 31 | 34 | 8 |
| Tensile strength (MPa) | 7.8 | 8.2 | 9.5 | 9.8 | 2.8 | 7.6 | 8.4 | 9.3 | 9.7 | 2.4 |
| Elongation at break (%) | 890 | 740 | 840 | 790 | 910 | 860 | 750 | 870 | 780 | 960 |
| Tensile strength: crescent specimen (kN/m) | 17 | 19 | 27 | 32 | 7 | 18 | 19 | 25 | 35 | 6 |

The invention claimed is:

1. An addition-curable liquid silicone rubber composition which gives a low-hardness silicone rubber having a durometer A hardness after curing of from 5 to 40, comprising:
   (A) 100 parts by weight of an alkenyl group-containing organopolysiloxane that includes at least two silicon-bonded alkenyl groups per molecule, has an average degree of polymerization of not more than 1,500 and is liquid at room temperature;
   (B) 1 to 200 parts by weight of an organopolysiloxane that has an average degree of polymerization of at least 2,000 and is raw rubber-like at room temperature;
   (C) an organohydrogenpolysiloxane containing at least two silicon-bonded hydrogen atoms per molecule, in an amount of 0.2 to 20 parts by weight per 100 parts by weight of components (A) and (B) combined;
   (D) fumed silica having a BET specific surface area of at least 130 m²/g, in an amount of 5 to 50 parts by weight per 100 parts by weight of components (A) to (C) combined;
   (E) trimethylsilanol or a linear organopolysiloxane which is liquid at room temperature, has an average degree of polymerization of 5 to 80, and has a silanol group at one end or at both ends of the molecular chain, in an amount of 0.1 to 10 parts by weight per 100 parts by weight of components (A) to (D) combined; and
   (F) a catalytic amount of an addition reaction catalyst.

2. The addition-curable liquid silicone rubber composition of claim 1, wherein component (D) is hydrophobically treated fumed silica.

3. The addition-curable liquid silicone rubber composition of claim 1, further comprising:
   (G) a silica surface treatment agent, in an amount of 0.1 to 50 parts by weight per 100 parts by weight of component (D).

4. The addition-curable liquid silicone rubber composition according to claim 1, wherein the silicone rubber mixture of components (A), (B) and (D) to (F) or the silicone rubber mixture of components (A) to (E) has a viscosity at 25° C. and a shear rate of 1 s⁻¹ when stored at 70° C. for 7 days which is not more than two times the viscosity at 25° C. and a shear rate of 1 s⁻¹ immediately following production.

* * * * *